US006955096B2

(12) United States Patent
Colombo et al.

(10) Patent No.: US 6,955,096 B2
(45) Date of Patent: Oct. 18, 2005

(54) MONITORING THE AXIAL LOAD ACTING ON THE HUB OF A MOTOR VEHICLE WHEEL

(75) Inventors: Giuseppe Colombo, Airasca (IT); Domenico Bosco, Turin (IT); Carlo Maldera, Giaveno (IT); Fulvio Nicastri, Garzigliana (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/619,217

(22) Filed: Jul. 14, 2003

(65) Prior Publication Data

US 2004/0074317 A1 Apr. 22, 2004

(30) Foreign Application Priority Data

Jul. 24, 2002 (IT) ..................................... TO2002A0653

(51) Int. Cl.[7] ................................................ G01L 3/02
(52) U.S. Cl. ................................................ 73/862.191
(58) Field of Search .......................... 73/795, 862.191, 73/862.55, 862.392, 800

(56) References Cited

U.S. PATENT DOCUMENTS

| 5,129,741 A | * | 7/1992 | Deane ......................... 384/448 |
| 5,678,933 A | * | 10/1997 | Ouchi et al. ................. 384/448 |
| 5,740,895 A | * | 4/1998 | Bigley ...................... 192/69.41 |
| 6,355,996 B1 | * | 3/2002 | Birkestrand .................. 310/54 |
| 6,532,666 B1 | * | 3/2003 | Denny et al. ............. 29/898.06 |
| 6,658,943 B2 | * | 12/2003 | McDearmon ................ 73/795 |
| 6,773,164 B2 | * | 8/2004 | Meeker et al. .............. 384/448 |

* cited by examiner

Primary Examiner—Max Noori
Assistant Examiner—Octavia Davis
(74) Attorney, Agent, or Firm—Merchant & Gould P.C.

(57) ABSTRACT

In a hub-bearing assembly for the wheel of a motor vehicle, the hub (1) forms integrally or is fixedly secured to a radial flange (7) fixable to a wheel (8). Associated with the assembly is a measuring device (14) mounted to a non-rotating part (12) of the vehicle and operatively facing a radial surface (13) integral with the flange (7). The measuring device (14) detects in real time variations of the axial position of the surface (13) caused by elastic deformation of the flange (7) provoked by forces transmitted from the wheel (8) to the hub flange (7).

8 Claims, 1 Drawing Sheet

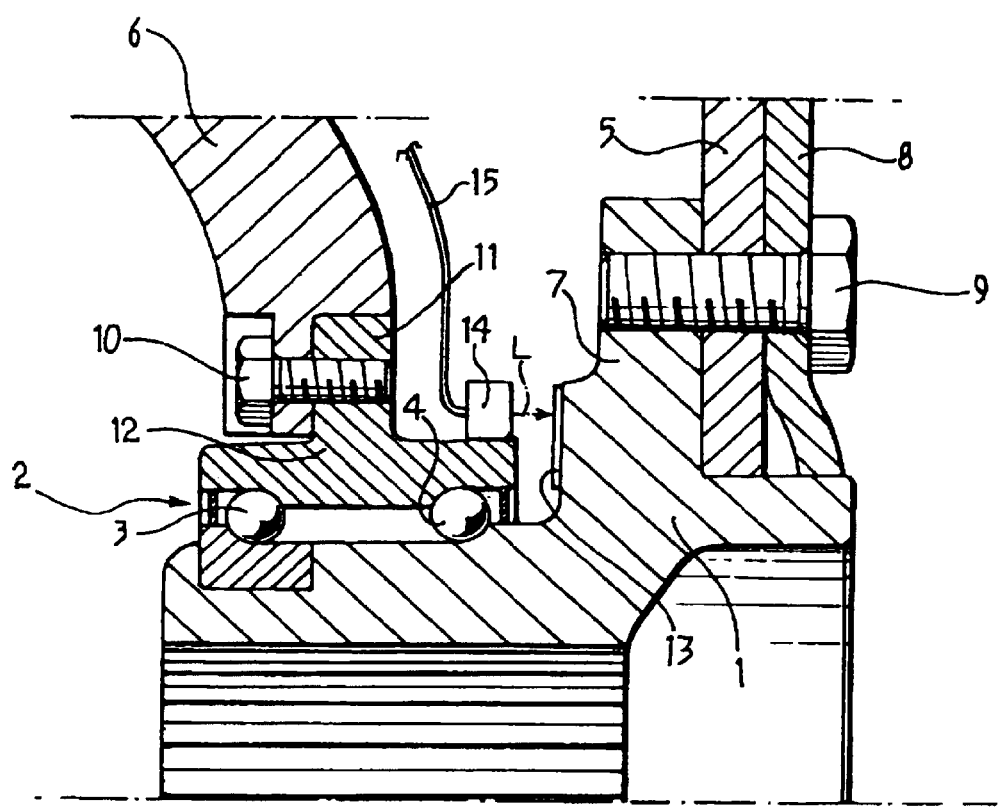

MONITORING THE AXIAL LOAD ACTING ON THE HUB OF A MOTOR VEHICLE WHEEL

The present invention refers to an apparatus for monitoring the axial load acting on the hub of a motor vehicle wheel, particularly an automobile.

The object of the present invention is to provide a continuous monitoring of the axial loads bearing on the hubs of the wheels of a motor vehicle in order to obtain real time information allowing to automatically control the braking system so as to improve its efficiency.

Another object of the invention is to attain indications in real time of an impending loss of adhesion (roadholding) between the wheel and the road, such that by generating an alarm signal the driver may be warned in time about the condition of impending danger.

These and other objects and advantages that will be better understood herein after, are accomplished according to the present invention by an apparatus having the features defining in the appended claims.

An embodiment of the invention will now be described by way of a not-limiting example, reference being made to the attached drawing, which is a partial axial sectional view of a hub-bearing unit for a motor vehicle wheel mounted to a suspension standard.

Throughout the present description and the claims, terms and expressions indicating positions and orientations are intended to refer to a condition mounted on a motor vehicle. So the expression "inner side" or "inboard side" indicates a side towards the centre line of the vehicle and the expression "outer side" or "outboard side" indicates a side towards the outside of the vehicle.

With reference to the drawing, a rotating hub 1 for a driving wheel of a motor vehicle is rotatably supported by a vehicle suspension through a bearing unit 2 having two sets of balls 3 and 4. The hub 1 has a central tubular portion open at both opposite ends, which forms, in this non-limiting embodiment, the radially inner raceway for the balls 4. At the axially outer end, the hub 1 forms a flange 7 extending in a radially outer direction to provide an axial rest for the wheel 8 that is fastened to the flange 7 by means of bolts 9. The same bolts 9 secure a brake rotor schematically indicated 5 (of the disc or drum type) to the hub between the wheel portion 8 and the hub flange 7.

The assembly comprising the hub 1 and the bearing unit 2 is supported by a standard 6, shown in partial cross-section, of the vehicle suspension. The standard 6 is connected by bolts 10 to a radial flange 11, which forms part of an outer race 12 of the bearing unit 2.

According to the present invention, the hub assembly is provided with a measuring device for detecting changes of the axial position of the hub flange with respect to a non-rotating part of the vehicle to attain an indication of the degree of the axial load acting on the hub.

A reflecting surface 13 is integral with the side of the flange 7 facing the inside of the vehicle, i.e. the inboard side. An optical emitter-receiver device, indicated overall 14, is fixed to a non-rotating member of the vehicle, in this example the non-rotating race 12 of the bearing unit, and projects a beam of light L onto the reflecting surface 13. The light radiation reflected by the reflecting surface 13 is picked up by the device 14, which measures continuously the distance, and particularly the changes of axial distance between the reflecting surface 13 and the fixed position where the measuring device 14 is mounted.

It will be observed that when the vehicle is travelling along a bend, the wheel 8 transmits to the flange 7 an axial load that tents to elastically deflect the flange in an axial plane, causing a consequent variation of the axial distance between the hub flange and the suspension. Data concerning the variation of axial distance are transmitted, for example through a cable 15, to an on-board electronic processing unit (not shown).

The electronic processing unit is provided with suitable application software for using the axial deformation data detected on the hub flange to calculate also the consequent axial displacement of the brake rotor 5 rigidly connected to the radial flange 7 of the hub and so consequently control the brake shoes such that these adjust their position to the position of the brake rotor (disc or drum). It is so possible to automatically control the brake shoe such that it adjusts to the axial displacement of the rotor in order that both braking members act in unison on the opposite surfaces of the brake rotor. As a result, the wearable members (pads or shoes) of the brake will undergo uniform wear. The brake as a whole will exhibit a better performance, and the wearable member will be prevented from adversely sliding against the brake rotor while travelling along a bend at high speed.

The application software of the on-board electronic processing unit may advantageously be set also for correlating data relative to the instantaneous variation of axial distance of the hub flange, possibly comparing this data to a pre-set reference value. Upon exceeding this value, a condition of excessive stress can be recognized, which can be indicative of a condition of impending loss of adhesion with the road. Upon exceeding a predetermined threshold, the system can therefore automatically generate an alarm signal that warns the driver about the danger of an incipient or impending condition of the vehicle sliding sideways for loss of adhesion. The warning signal can be transmitted through sight and/or sound indicator means located in the passenger cabin.

The constructional and functional features of the measuring device (which may be of any known kind, for example of the laser type) are not per se relevant for the understanding of the invention and will not therefore be described in detail herein. Suffice it here to say that the measuring device can include a laser displacement sensor (with a resolution of 1–3 microns) or a sensor of other kind, for example an inductive position sensor (with a resolution of about 2 microns). In this latter case, the surface 13 is of a metallic material.

The measuring is preferably carried out in proximity of the peripheral zone of the flange, where the elastic deflection becomes more apparent and can be detected more easily. The reflecting surface 13 is therefore preferably located at a radial position not too near to the rotation axis A. Furthermore, the reflecting surface is preferably facing the inboard side of the vehicle, as shown, so as to be protected from external agents such as dust and mud.

The reflecting surface 13 can consist of a reflecting element distinct from and fixed to the hub flange, or, as an alternative, may consist of a surface of the flange 7 suitably treated so as to be reflecting.

The choice of mounting the measuring device 14 on the non-rotating race 12 of the bearing, and particularly on the cylindrical surface 16 near to the flange 11, constitutes a preferred but not compulsory choice for the purposes of the implementation of the present invention. As an alternative, the measuring device 14 could be fixed for example to the suspension standard 6.

What is claimed is:

1. A hub-bearing assembly for the wheel of a motor vehicle, the hub forming integrally or being securely fixed to a radial flange to be fastened to a wheel, wherein, associated with the assembly is an optical measuring device mounted on a non-rotating part of the vehicle and axially facing an essentially radial optically reflecting surface secured to or integral with the flange for detecting real time variations of the axial position of the surface due to elastic deformation of the flange, the measuring device including emitter means for projecting a light radiation onto the reflecting surface and receiver means for receiving the light radiation reflected back by the reflecting surface, for detecting real time variations of the axial position of the surface due to elastic deformation of the flange caused by forces transmitted from the wheel to the hub flange.

2. The assembly of claim 1, wherein the optical measuring device includes emitter means for emitting a laser beam.

3. The assembly of claim 1, wherein the measuring device is arranged for carrying out said measuring operation in proximity of the peripheral zone of the hub flange.

4. The assembly of claim 1, wherein the surface is facing the inboard side of the vehicle.

5. The assembly of claim 1, wherein the measuring device is fixable to a non-rotating race of the bearing.

6. The assembly of claim 1, wherein the measuring device is connected to an electronic processing unit mounted on board of the vehicle and set for automatically controlling, based on the deformation signals received from the measuring device, the wearable members of the braking system for adapting their position to the position of a rotor brake rigidly connected to the flange of the hub.

7. The assembly of claim 1, wherein the measuring device is connected to an electronic processing unit mounted on board of the vehicle and set for recognizing, based on the deformation signals received from the measuring device, a condition indicative of an impending loss of adhesion with the road.

8. The assembly of claim 1, wherein the measuring device includes an inductive position sensor and that the essentially radial surface is of a metallic material.

* * * * *